United States Patent Office

3,205,237
Patented Sept. 7, 1965

3,205,237
PROCESS FOR THE PREPARATION OF SULTONES
Bruno Blaser, Dusseldorf-Urdenbach, and Hans-Jürgen Tietz, Dusseldorf, Germany, assignors to Henkel & Cie., G.m.b.H., Dusseldorf-Holthausen, Germany, a corporation of Germany
No Drawing. Filed July 23, 1963, Ser. No. 296,909
Claims priority, application Germany, Aug. 31, 1962, H 46,802
11 Claims. (Cl. 260—327)

The present invention relates to a process for the preparation of sultones from butadiene and isoprene.

Very little is known about the reaction of sulfur-trioxide and butadiene and its derivatives. A. P. Terentyev and A. V. Dombrovsky (Journal of General Chemistry U.S.S.R. 21, 1951/1952, pages 775–785) have described the preparation of dienesulfonic acids by reaction of butadiene and its homologues with $SO_3$-pyridine. Upon attempting to react butadiene, isoprene and other dienes with $SO_3$-dioxan, these authors obtained dark resinous products even at lower reaction temperatures and in the presence of solvents. They were able to determine that no useful results were furnished by working up these reaction products. Merely in the case of the reaction of $SO_3$-dioxan with isoprene were they able to isolate from the tar-like reaction product, by reaction with a barytes solution, a small trace of the barium salt of a sulfonic acid whose composition or structure could not be determined.

In view of the unfavorable results which the abovementioned authors obtained from the reaction of butadiene, isoprene and other dienes with $SO_3$-dioxan, it was surprising that products were obtained from this reaction which cannot be regarded as tar-like resinous product and which can readily be worked up. Upon hydrolysis, these products do not, as was to be expected from the Russian article, furnish dienesulfonic acids but rather hydroxyalkenesulfonic acids, namely with good yields.

It is, therefore, an object of this invention to provide a method for producing saturated sultones from dienes such as butadiene and isoprene.

This and other objects of our invention will become apparent as the description thereof proceeds.

In accordance with the process of the present invention, saturated sultones are prepared by hydrolyzing the reaction with addition products of sulfurtrioxide to organic, oxygen-containing compounds, and subsequently hydrogenating the unsaturated hydroxysulfonic acids formed thereby. The saturated hydroxysulfonic acids produced in this manner yield sultones by splitting off water.

The addition products of sulfurtrioxide to oxygencontaining organic compounds, which are employed for the reaction with the above-mentioned dienes, are well known substances. Examples are primarily addition products of ether and ketones, such as dioxan, diethylether, dichlorodiethylether, polyglycol ethers whose terminal hydroxyl groups are etherified, acetone, methyl ethyl ketone and the like. It is preferred to employ the addition products of dioxan and sulfurtrioxide.

The reaction of the dienes with the sulfurtrioxide addition products is advantageously performed in an organic solvent. Ethylenechloride has proved to be particularly suitable. In addition, suitable solvents include, for example, hexane, dioxane or methylenechloride.

Either the diene or the sulfonation agent may be provided as the starting material in the sulfonation reaction. In the latter case the diene may be added in a gaseous state or also in liquid form, advantageously in an organic solvent.

The reaction temperature at which the sulfonation reaction may be performed may vary over wide limits. The lower temperature limit depends upon the type of solvent which is used. If methylenechloride is used, it is possible to work at low temperatures of about $-70°$ C. However, it is not necessary to employ such low temperatures. Thus, for example, very good results were still obtained at $+80°$ C. The reaction may also be performed at temperatures above $+100°$ C. However, such a procedure scarcely provides any advantages. Advantageously, the reaction is performed at temperatures between $-10°$ C. and $+50°$ C.

The starting materials may be employed in equivalent amounts. In some instances, however, it is also advantageous to employ an excess of the sulfonation mixture, for instance, 2 mols of the $SO_3$-addition compound per mol of the diene.

The oily products obtained by the reaction of the diene with the $SO_3$-adduct are first hydrolyzed. Unsaturated hydroxysulfonic acids or their salts are obtained thereby. In the event that butadiene is used as the starting material, hydroxybutenesulfonic acid is formed. Since the subsequent hydrogenation can be performed in aqueous solution, water may be used in excess for the hydrolysis. It is also possible to use aqueous alkaline solutions, such as solutions of alkali metal or alkaline earth metal hydroxides, ammonia or alkali metal carbonates, in place of water, and in this manner directly produce the salts of the sulfonic acids formed by the reaction. For isolation and purification of the sulfonic acids, the barium and calcium salts have proved to be particularly suitable. However, it is not necessary to isolate the salt. Instead, the raw aqueous solutions of the hydrolyzates may be used directly for the subsequent hydrogenation. It has surprisingly been found that the hydrogenation yields different products, depending upon whether the free sulfonic acids or their salts are used as starting materials. For instance, if the hydroxybutenesulfonic acid produced from butadiene is hydrogenated in the form of its sodium or barium salt in neutral aqueous solution, a saturated sulfonic acid is obtained which yields butanesultone-1,4 upon splitting off water; thus this compound can be regarded a 4-hydroxybutane-1-sulfonic acid. On the other hand, if the hydroxybutenesulfonic acid is hydrogenated under otherwise identical conditions, a saturated hydroxybutanesulfonic acid is obtained from which another sultone is obtained by splitting off water, namely, probably butanesultone-1,3.

The hydrogenation may be performed by well known methods, for instance, by using customary catalysts, for example, finely divided palladium or platinum and the like, at room temperature as well as at elevated temperatures, at atmospheric or elevated pressures. Water can be used as the solvent. However, the hydrogenation may also be performed in organic solvents, such as lower alcohols or glacial acetic acid, provided the sulfonic acids or their salts are sufficiently soluble therein.

The sultones may be obtained from the saturated hydroxysulfonic acids formed by the hydrogenation in known fashion by splitting off water. The dehydration may take place in one single process step together with the distillation of the sultone. It is not necessary to isolate or purify the sulfonic acids prior thereto. Instead, the solutions obtained upon hydrogenation may be evaporated and the residues may be directly transformed into the sultone.

In order to obtain sultones from the salts of the saturated hydroxysulfonic acids, they may initially be transformed into the free hydroxysulfonic acids with the aid of strong acids, such as hydrochloric acid, or more advantageously with the aid of ion exchangers. However, it is also possible to obtain the sultones directly from the alkali metal or ammonium salts of the hydroxysulfonic acids, for instance, by the process of German Patent No. 1,107,221 (corresponding to U.S. application Serial No. 107,292, now having matured to U.S. Patent No. 3,146,242), by treating the salts at elevated temperatures and under reduced pressure with a strong acid, especially with concentrated sulfuric acid, which is less volatile than the corresponding sultone, and distilling the latter from the reaction mixture. In this procedure the sulfuric acid is advantageously added in such quantities that after the reaction has gone to completion the residue consists essentially of the bisulfate. This has the advantage that the reaction mixture remains liquid until the end of the distillation.

Another advantageous method for the technical recovery of the sultones consists of hydrogenating the hydroxysulfonic acids in the form of their alkaline earth metal salts, such as the calcium or barium salts, subsequently precipitating the alkaline earth metal ions as the sulfate, evaporating the solutions of the free sulfonic acids thus obtained and thereafter splitting off water from the sulfonic acids.

The following specific examples are presented to illustrate the invention and to enable persons skilled in the art to better understand and practice the invention and are not intended to be limitative.

*Example I*

80 g. of sulfurtrioxide were added dropwise at 0° C. in the course of 30 minutes to a solution of 88 g. of dioxane in 300 cc. of ethylenechloride, accompanied by vigorous stirring. A solution of 54 g. of butadiene in 300 cc. of ethylenechloride was added in the course of 10 minutes to the suspension of the dioxane-$SO_3$ adduct thus obtained, whereby the temperatures of the reaction mixture rose from −15° C. to +1° C. Thereafter, the mixture, the mixture was stirred for 1 hour at 0° C., and then for 1 hour at room temperature.

For hydrolysis, 900 cc. of water were added and the ethylenechloride was distilled off with steam. Thereafter, the hydrolisate was admixed with 164 g. of $$Ba(OH)_2 \cdot 8H_2O$$

and the mixture was heated for 2 hours on a steam bath. The precipitated barium sulfate (28.4 g.) was separated by vacuum filtration. Thereafter, the excess barium hydroxide was precipitated as bariumcarbonate by introducing carbon dioxide, and the precipitate was filtered off. The filtrate was evaporated to dryness. 174.7 g. of barium hydroxybutenesulfonate (80% of theory) remained behind in the form of a slightly yellow salt. The analysis of the raw product furnished the following values:

|    | Calculated | Found |
|----|------------|-------|
| S  | 14.59      | 14.39 |
| Ba | 31.24      | 31.18 |

66.8 g. of the bariumhydroxybutenesulfonate produced in the manner described above, were dissolved in 500 cc. of water and the solution was shaken with 20 g. of Raney nickel at 24° C. in an atmosphere of hydrogen at atmospheric pressure. 6.2 liters of hydrogen (85% of theory) were absorbed thereby in the course of 3 hours. The solution was filtered off from the catalyst. The filtrate was passed over a strongly acid ion exchanger and was subsequently evaporated in an aspirator vacuum. The brown oily residue was subjected to vacuum distillation. 34.6 g. of an oil distilled over at a pressure between 0.2–0.7 mm. mercury and a bath temperature of 180–205° C.; the distillate still contained a certain amount of water. By repeating the distillation at a pressure of 0.2 mm. mercury, 24.5 g. of butanesultone-1,4 were obtained which had a boiling point of 90–92° C. at 0.2 mm. mercury.

*Example II*

80 g. of sulfurtrioxide were added dropwise in the course of 30 minutes to a solution of 88 g. of dioxane in 300 cc. of ethylenechloride, accompanied by vigorous stirring. The temperature of the mixture was maintained at 0° C. by cooling. To the suspension of the dioxane-$SO_3$ adduct thus obtained, a solution of 68 g. of isoprene in 300 cc. of ethylene-chloride was added dropwise while stirring, whereby the temperature of the mixture rose from −12° to 0° C. The clear solution obtained thereby was subsequently stirred for 1 hour at 0° C. and then for an additional hour at room temperature. Thereafter, 1 liter of water was added and the ethylene-chloride was distilled off with steam.

The hydrolysate thus obtained was admixed with 166.8 g. of $Ba(OH)_2 \cdot 8H_2O$ and the mixture was heated for 2 hours on a steam bath. Subsequently, the precipitated bariumsulfate (17.1 g.) was separated by vacuum filtration. The excess barium was precipitated as barium carbonate by introducing carbon dioxide into the filtrate, and the precipitate was again filtered off. The filtrate was evaporated to dryness. 192 g. (80% of theory) of bariumhydroxymethylbutenesulfonate were obtained thereby in the form of a light yellow salt. The analysis of the raw product furnished the following values:

|    | Calculated | Found |
|----|------------|-------|
| C  | 25.67      | 25.60 |
| H  | 3.88       | 3.85  |
| S  | 13.71      | 13.42 |
| Ba | 29.38      | 29.01 |

69 g. of the bariumhydroxymethylbutenesulfonate produced in the manner described above were dissolved in 600 cc. of water, and the solution, after addition of 5 g. of Raney nickel was hydrogenated in a shaker autoclave at 23° C. and a pressure of 40 atmospheres of hydrogen. 68% of the theoretical amount of hydrogen was absorbed thereby over the course of 6 hours. The solution was filtered off from the catalyst. The filtrate was passed over a strongly acid ion exchanger. The solution thus obtained was evaporated in an aspirator vacuum. The brown oily residue was subjected to vacuum distillation. 26.3 g. of a slightly yellow oil passed over at a pressure between 0.2 and 1.5 mm. mercury and a bath temperature of 180 to 235° C.; the distillate still contained a small amount of water. By repeating the vacuum distillation, 19.6 g. of a sultone were obtained which had a boiling point of 106° C. at 0.2 mm. mercury; the product was probably a methylbutanesultone-1,4.

*Example III*

A solution of 54 g. of butanediene in 100 cc. of ethylenechloride was added in the course of 5 minutes to a suspension of an adduct of 88 g. of dioxane and of 80 g. of sulfurtrioxide, prepared as described in Example I, in 300 cc. of ethylenechloride accompanied by vigorous stirring and cooling with ice. The temperature of the mixture was maintained between 25 and 35° C. The brown oil which immediately separated out was stirred for a few minutes and was subsequently admixed with 1 liter of water. Thereafter, the ethylenechloride was distilled off with the aid of steam. The acid aqueous hydrolysate was admixed with 18 g. of barium chloride. Thereafter, 11.8 g. of bariumsulfate were filtered off. The filtrate was adjusted to a pH of 7 with the aid of sodium-hydroxide, and was then hydrogenated at 29° C. and 40 atmospheres of hydrogen using Raney nickel as the catalyst. 86% of the theoretical amount of hydrogen was absorbed in the course of 1½ hours. The solution was filtered off from the catalyst and the filtrate was passed over a strongly acid ion exchanger. Subsequently, the solution was evaporated in vacuo. 133.4 g. of a brown oil remained behind, which were subjected to vacuum distillation at 0.5 to 1 mm. mercury. 88.2 g. of raw butanesultone-1,4 distilled over, which still contained a small amount of water. After repeating the vacuum distillation at 0.5 mm. mercury, 84.1 g. of pure, colorless butanesultone were obtained.

Example IV

A solution of 68 g. of isoprene in 300 cc. of ethylene chloride was added in the course of 10 minutes to a suspension of an adduct of 88 g. of dioxane and 80 g. of sulfurtrioxide in 300 cc. of ethylene chloride, prepared as described in Example I, accompanied by vigorous stirring and cooling with a mixture of ice and salt. The temperature was maintained below $+1°$ C. A clear yellow solution formed, which was stirred for 1 hour at $0°$ C. and subsequently for an additional hour at room temperature. After addition of 1 liter of water the solvent was distilled off with the aid of steam. The acid hydrolysate was adjusted on a pH value of 7 with sodiumhydroxide, the solution was concentrated to 850 cc., and the concentrate was hydrogenated at a temperature of $21°$ C. and a hydrogen pressure of 40 atmospheres in the presence of Raney nickel as a catalyst. 67% of the theoretically calculated amount of hydrogen was absorbed in the course of 2 hours. The solution was filtered off from the catalyst and the filtrate was passed over a strongly acid ion exchanger. Thereafter, the solution was evaporated in vacuo at a temperature of $60°$ C. 198.5 g. of a brown oil remained behind, which was subjected to vacuum distillation. 79.7 g. of raw sultane were obtained which still contained a small amount of water. By repeating the distillation 64.4 g. of pure, water-clear methylbutanesultone 1,4 having a boiling point of $105-106°$ C. at 0.2 mm. mercury were obtained.

Example V 80 g. of sulfurtrioxide were added dropwise in the course of 30 minutes to a solution of 116 cc. of dichlorodiethyl ether in 400 cc. of ethylenechloride, accompanied by vigorous stirring and cooling with a mixture of ice and salt. The clear yellow solution of the adduct obtained thereby was admixed in the course of 10 minutes with a solution of 54 g. of butanediene in 100 cc. of ethylenechloride, accompanied by stirring, whereby the temperature of the mixture increased from $-15°$ C. to $+1°$ C. The reaction mixture was stirred first for 1 hour at $0°$ C., and subsequently for 2 additional hours at room temperature. Thereafter, 1.4 liters of water were added and the ethylenechloride was distilled off with the aid of steam. The solution thus obtained was admixed with 177 g. $Ba(OH)_2 \cdot 8H_2O$ and the mixture was heated on a water bath for 2 hours. Thereafter, the solution was separated from the precipitated bariumsulfate (77.2 g.). The excess barium was precipitated as bariumcarbonate by introducing carbondioxide, and the precipitate was filtered off. The filtrate was evaporated to dryness. 135.3 g. of bariumhydroxybutenesulfonate remained behind, which were transformed into butanesultone-1,4 in the same manner as described in Example I.

Example VI 80 g. of sulfurtrioxide were added dropwise at $0°$ C. in the course of 30 minutes to a solution of 88 g. of dioxane in 300 cc. of hexane, accompanied by vigorous stirring. The suspension of the adduct thus obtained was admixed in the course of 10 minutes with a solution of 54 g. of butanediene in 100 cc. of hexane accompanied by stirring, the temperature being maintained between $-4°$ C. and $+3°$ C. by cooling. The reaction mixture was subsequently stirred for 1 hour at $0°$ C. and then for 2 additional hours at room temperature. Thereafter, 500 cc. of water were added and the hexane was distilled off. The solution thus obtained was admixed with 196.4 g. $Ba(OH)_2 \cdot 8H_2O$, and the mixture was heated for 2 hours on a steam bath. Thereafter, the solution was separated by vacuum filtration from the precipitated barium sulfate (55.3 g.). The excess barium was precipitated as bariumcarbonate by introducing carbondioxide, and the precipitate was again filtered off. The filtrate was evaporated to dryness. 125.2 g. of bariumhydroxybutenesulfonate remained behind, which were transformed into the sultone in the same manner as in Example II.

Example VII

A suspension of the adduct of 44 g. of dioxane and 40 g. of sulfurtrioxide in 200 cc. of ethylenechloride, prepared in the same manner as in Example I, was admixed in the course of 10 minutes with a solution of 27 g. of butadiene in 50 cc. of ethylenechloride, accompanied by vigorous stirring and cooling with ice. The brown oil which immediately separated out was stirred for 1 hour at 25 to $30°$ C. and was subsequently admixed with 500 cc. of water. Thereafter, the ethylenechloride was distilled off with the aid of steam. The acid solution obtained thereby, after addition of 0.5 g. of palladiumhydroxide on charcoal (10%), was hydrogenated at $150°$ C. and a hydrogen pressure of 200 atmospheres. 55% of the calculated amount of hydrogen was absorbed in the course of 9 hours. The solution was separated by filtration from the catalyst and was then evaporated. The oily residue thus obtained (50 g.) was distilled in vacuo. 20.5 g. of a practically colorless butanesultone were obtained, which passed over between 94 and $99°$ C. at 0.3 mm. mercury. This sultone was not identical with the butanesultone-1,4 obtained persuant to Example I. It is probably butanesultone-1,3.

Example VIII 80 g. of sulfurtrioxide were added dropwise at $0°$ C. in the course of 30 minutes to a solution of 44 g. of dioxane in 300 cc. of ethylenechloride, accompanied by vigorous stirring. The suspension thus obtained was admixed in the course of 5 minutes with a solution of 54 g. of butadiene in 100 cc. of ethylenechloride, accompanied by vigorous stirring and cooling with ice. The temperature was maintained between 25 to $35°$ C. during that time. The brown oil which separated out was stirred for 1 hour and was subsequently admixed with 1 liter of water. Thereafter, the solvent was distilled off with the aid of steam. The acid solution obtained thereby was neutralized by addition of concentrated ammonia solution, and the neutralized solution was hydrogenated at $25°$ C. and 40 atmospheres of hydrogen using 10 g. of Raney nickel as the catalyst. 82.5% of the calculated amount of hydrogen was absorbed in the course of 3½ hours. The solution was separated by filtration from the catalyst. The filtrate was evaporated to dryness. The oily residue was admixed with 100 g. of sulfuric acid and the mixture was distilled in vacuo at 0.2 mm. mercury. 66.9 g. of butanesultone-1,4 were obtained thereby.

The above-described run was repeated, except that sodiumhydroxide, potassium hydroxide and calcium hydroxide were used for neutralization of the acid solution in place of ammonia prior to the hydrogenation. The yields of butanesultone obtained thereby are shown in the following table.

| Alkali: | Sultone-yields, g. |
|---|---|
| NaOH | 67 |
| KOH | 63 |
| $Ca(OH)_2$ | 70 |

Example IX

A solution of 54 g. of butadiene in 300 cc. of ethylenechloride was cooled to $-15°$ C. and was then admixed over the course of 10 minutes with a suspension of the adduct of 88 g. of dioxane and 80 g. of sulfurtrioxide in 300 cc. of ethylenechloride, accompanied by vigorous stirring. The temperature during that time ranged between $-15°$ C. and $0°$ C. The mixture was stirred for 1 hour at $0°$ C. and then for 1 hour at room temperature. Thereafter, 900 cc. of water were added and the solvent was distilled off with steam. The hydrolysate was admixed with 164 g. of $Ba(OH)_2 \cdot 8H_2O$ and the mixture was heated for 2 hours on a steam bath. The precipitated bariumsulfate (28.4 g.) was separated by vacuum filtration. Thereafter, the excess bariumhydroxide was precipitated as barium carbonate by introduction of carbondioxide, and the precipitate was again filtered off. Upon evaporation 174.7 g. of bariumhydroxybutenesulfonate remained behind. The salt thus obtained was transformed into sultone in the same manner as described in Example I.

Example X

A solution of 15 g. of isoprene in 50 cc. of ethylene chloride was cooled to 0° C. and was then admixed over the course of 5 minutes with a suspension of the adduct of 19.5 g. of dioxane and 17.8 g. of $SO_3$ in 50 cc. of ethylenechloride, accompanied by vigorous stirring. During that time the temperature ranged about +10° C. The clear yellow solution was stirred for 1 hour at room temperature. Thereafter, 150 cc. of water were added and the solvent was distilled off with steam. The hydrolysate was admixed with 41.3 g. of $Ba(OH)_2 \cdot 8H_2O$ and the mixture was heated for 2 hours on a steam bath. The precipitated bariumsulfate (16.8 g.) was separated by vacuum filtration. Thereafter, the excess bariumhydroxide was precipitated as barium carbonate by introducing carbondioxide, and the precipitate was again filtered off. Upon evaporation of the filtrate, 29.0 g. of bariumhydroxymethylbutenesulfonate remained behind. The salt thus obtained was transformed into sultone in the same manner as described in Example II.

Example XI

A solution of 27 g. of butadiene (0.5 mol) in 100 cc. of ethylenechloride was cooled to −20° C. and, while vigorously stirring, was admixed with a suspension of the adduct of 80 g. of dioxane and 80 g. of $SO_3$ (1 mol) in 300 cc. of ethylenechloride. During this time the temperature did not rise above −5° C. Thereafter, the mixture was stirred for 1½ hours at room temperature. The yellow, resinous reaction product transformed into a brown oil. Thereafter, 1 liter of water was added and the solvent was distilled off with steam. The hydrolysate was admixed with 216.3 g. of $Ba(OH)_2 \cdot 8H_2O$ and the mixture was heated for 2 hours on a steam bath. The precipitated bariumsulfate (91.2 g.) was separated by vacuum filtration. Subsequently, the excess bariumhydroxide was precipitated as bariumcarbonate by introducing carbondioxide, and the precipitate was again filtered off. After evaporating the filtrate 111.7 g. of bariumhydroxybutenesulfonate remained behind; that is, the yield was practically quantitative. The salt thus obtained was transformed into sultone in the same manner as described in Example I.

Example XII 80 g. of sulfurtrioxide (1 mol) were added dropwise at 0° C. to a solution of 88 g. dioxane (1 mol) in 300 cc. of ethylenechloride, accompanied by vigorous stirring. The suspension of the dioxane-$SO_3$-adduct was admixed at −5° C. to +3° C. with a solution of 27 g. butadiene (5 mol) in 50 cc. of ethylenechloride. The reaction mixture was stirred for 15 minutes at 0° C. and then for 1 hour at room temperature. Thereafter, 1 liter of water was added and the solvent was distilled off with steam. The hydrolysate was admixed with 255.1 g. of $Ba(OH)_2 \cdot 8H_2O$ and the mixture was heated for 2 hours on a steam bath. Thereafter, the precipitated bariumsulfate (154.6 g.) was separated by vacuum filtration, the excess bariumhydroxide was precipitated as bariumcarbonate by introduction of carbondioxide and the precipitate was again filtered off. Upon evaporation of the filtrate 86.6 g. of bariumhydroxybutenesulfonate remained behind. The salt obtained in this manner was transformed into sultone in the same manner as described in Example I.

Example XIII

Dry, gaseous butadiene was introduced at −10° C. to 0° C. into the suspension of the adduct of 80 g. of sulfurtrioxide and 88 g. of dioxide in 300 cc. of ethylenechloride while vigorously stirring and cooling with a mixture of ice and salt. The butadiene was immediately absorbed. The white, flocculent precipitate thereby transformed into a viscous brown oil. After 3.5 hours no further butadiene was absorbed. The reaction mixture was admixed with 1.75 liter of water and 347 g. of $Ba(OH)_2 \cdot 8H_2O$, the resulting mixture was heated on a steam bath for 1 hour, and then the solvent was distilled off with steam. The precipitated bariumsulfate (75.1 g.) was separated by vacuum filtration. Thereafter, the excess bariumhydroxide was precipitated as bariumcarbonate by introducing carbondioxide, and the precipitate was again filtered off. The filtrate was evaporated to dryness. 155 g. of virtually colorless bariumhydroxybutenesulfonate remained behind. The salt thus obtained was transformed into sultone in the same manner as described in Example I.

Example XIV 80 g. of $SO_3$ were added dropwise to a solution of 88 g. of dioxane in 300 cc. of ethylenechloride at 0° C. while vigorously stirring. The suspension of the dioxane-$SO_3$-adduct was admixed in the course of 8 minutes at 35° to 75° C. with the solution of 54 g. butadiene in 100 cc. of ethylenechloride. The reaction mixture was stirred for 1½ hours at 75–85° C. Thereafter, 1 liter of water was added and the solvent was distilled off with steam. The hydrolysate was admixed with 161.1 g. of $Ba(OH)_2 \cdot 8H_2O$, and the mixture was heated on a steam bath for 2 hours. The precipitated bariumsulfate (27.2 g.) was separated by vacuum filtration. Thereafter, the excess bariumhydroxide was precipitated as bariumcarbonate by introducing carbondioxide, and the precipitate was again filtered off. Upon evaporation of the filtrate 158.3 g. of bariumhydroxybutenesulfonate remained behind. The salt thus obtained was transformed into sultone in the same manner as described in Example I.

Example XV 80 g. of $SO_3$ were slowly added dropwise to a solution of 74 g. of diethylether in 300 cc. of ethylenechloride, accompanied by vigorous stirring. Thereafter, while stirring, a solution of 54 g. of butadiene in 100 cc. of ethylenechloride was added, while the temperature of the mixture was maintained between −2° C. and +4° C. by cooling with a mixture of ice and salt. The mixture was stirred for 1 hour at 0° C. and then for 1 hour at 20° C. After adding 1 liter of water the solvent was distilled off with steam. The residual aqueous solution was admixed with 238 g. of $Ba(OH)_2 \cdot 8H_2O$ while being heated. The precipitated bariumsulfate (81.4 g.) was separated by vacuum filtration. Thereafter, the excess bariumhydroxide was precipitated as bariumcarbonate by introducing carbondioxide, and the precipitate was again filtered off. The filtrate was evaporated to dryness. 138 g. of bariumhydroxybutenesulfonate remained behind. The salt thus obtained was transformed into sultone in the same manner as described in Example I.

Example XVI 80 g. of $SO_3$ were added dropwise to 352 cc. of anhydrous dioxane while stirring. The temperature of the mixture was maintained between +10° C. and +22° C. by cooling with ice. The suspension obtained in this manner was admixed over the course of about 5 minutes with 54 g. of liquid butadiene while stirring, whereby the temperature rose to +42°C. Thereafter, the reaction mixture was stirred for 1 hour at room temperature. After addition of 1250 cc. of water the dioxane was distilled off.

The acid solution thus obtained was admixed with $Ba(OH)_2 \cdot 8H_2O$ until it reacted strongly alkaline, for which 195 g. of bariumhydroxide were required. 21.5 g. of bariumsulfate separated out, which were filtered off. Subsequently the excess bariumhydroxide was precipitated as bariumcarbonate by introducing carbondioxide, and the precipitate was again filtered off. The filtrate was evaporated to dryness. 189.6 g. of almost colorless bariumhydroxybutenesulfonate remained behind (86.4% of theory).

76.8 g. of bariumhydroxybutenesulfonate prepared in the preceding manner were dissolved in 200 cc. of water. The barium salt present in the solution was transformed into the free acid by treatment with a strong acid ion exchanger. Thereafter, the solution was evaporated. The residue was dissolved in 300 cc. of methanol. The methanolic solution of the hydroxybutenesulfonic acid was hydrogenated at 20° C. and at a hydrogen pressure of 40 atmospheres in a shaker autoclave in the presence of 5 g. of Raney nickel. 94% of the calculated hydrogen was absorbed over the course of 12 minutes. The catalyst was filtered off. Small amounts of nickel were then removed from the filtrate with the aid of an ion exchanger. Thereafter, the solution was evaporated in vacuo. The residue (47.6 g.) was distilled in vacuo. At a boiling temperature of 112–124° C. and a pressure of 0.4 mm. mercury 30.4 g. of butanesultone passed over as a colorless liquid.

While certain specific examples and preferred modes of practice of the invention have been set forth it will be understood that this is solely for the purpose of illustration and that various changes and modifications may be made without departing from the spirit of the disclosure and the scope of the appended claims.

We claim:
1. A process for the preparation of organic sultones which comprises:
   (a) reacting (1) an addition product of sulfur trioxide and organic oxygen containing compounds selected from the group consisting of ethers and ketones with (2) an organic diene selected from the group consisting of butadiene and isoprene to form a sulfonation product wherein said addition product of sulfur trioxide is employed in at least equivalent amounts with respect to said organic diene,
   (b) hydrolyzing said sulfonation product to obtain an unsaturated hydroxy sulfonic acid,
   (c) hydrogenating said unsaturated sulfonic acids to obtain a saturated hydroxy sulfonic acid,
   (d) and thereafter dehydrating said saturated hydroxy sulfonic acid to obtain a sultone.

2. A process according to claim 1 wherein the sulfur trioxide addition products are those formed with compounds selected from the group consisting of ethers and ketones.

3. A process according to claim 1, wherein the addition product of sulfur trioxide is that formed with dioxane.

4. A process according to claim 1, wherein the sulfonation reaction is performed in an organic solvent.

5. A process according to claim 4, wherein ethylenechloride is used as the organic solvent.

6. A process according to claim 1, wherein the sulfonation is performed at temperatures between about $-70°$ C. and $+100°$ C.

7. A process according to claim 1, wherein the sulfonation is performed at temperatures between about $-10°$ C. and $+50°$ C.

8. A process according to claim 1, wherein the unsaturated hydroxysulfonic acids are hydrogenated in the form of their salts.

9. A process according to claim 8, wherein the salts of unsaturated hydroxysulfonic acids are selected from the group consisting of alkali metal, alkaline earth metal and ammonium salts.

10. A process according to claim 1, wherein the hydrogenation is performed in aqueous solutions.

11. A process according to claim 2 wherein the compound for forming the addition products of sulfur trioxide is an ether.

References Cited by the Examiner

UNITED STATES PATENTS 2,219,748  10/40  Nawiasky et al. _____ 260—327

FOREIGN PATENTS 905,684    4/45  France.
1,107,220  5/61  Germany.
1,107,221  5/61  Germany.

OTHER REFERENCES

Bordwell et al.: Jour. Amer. Chem. Soc., vol. 76 (1954), pages 3945–3950.

Suter et al.: Jour. Amer. Chem. Soc., vol. 60 (1938), pages 538–540.

WALTER A. MODANCE, *Primary Examiner.*

JOHN D. RANDOLPH, *Examiner.*